United States Patent [19]

Klinkowski

[11] 4,419,209

[45] Dec. 6, 1983

[54] SOLID POLYMERIC ELECTROLYTE

[75] Inventor: Peter R. Klinkowski, Norwalk, Conn.

[73] Assignee: Dorr-Oliver Incorporated, Stamford, Conn.

[21] Appl. No.: 285,196

[22] Filed: Jul. 20, 1981

[51] Int. Cl.³ .................. C25B 13/08; B01D 13/00
[52] U.S. Cl. ................................. 204/296; 204/301
[58] Field of Search ........................... 204/295–296, 204/180 P, 301

[56] References Cited

U.S. PATENT DOCUMENTS

| | | | |
|---|---|---|---|
| 3,725,235 | 4/1973 | Mintz | 204/301 |
| 3,922,432 | 11/1975 | Renn | 204/180 P X |
| 4,116,889 | 9/1978 | Chlanda et al. | 204/180 P X |
| 4,224,121 | 9/1980 | Dempsey et al. | 204/296 X |
| 4,312,729 | 1/1982 | Wills | 204/180 P |

Primary Examiner—Donald R. Valentine
Attorney, Agent, or Firm—Burtsell J. Kearns; Harold M. Snyder; R. Lawrence Sahr

[57] ABSTRACT

A strong, relatively inert filter cloth is impregnated with an ion exchange resin to provide, for an electrofiltration process, a reinforced solid polymeric electrolyte having ion transport properties and at the same time constituting a positive barrier to mass transport.

5 Claims, No Drawings

4,419,209

SOLID POLYMERIC ELECTROLYTE

BACKGROUND OF THE INVENTION

Process and apparatus for carrying out dewatering of suspensions is disclosed in U.S. Pat. No. 4,168,222, issued Sept. 18, 1979, U.S. Pat. No. 4,207,158, issued June 10, 1980 and copending application Ser. No. 109,931, filed Jan. 4, 1980 now U.S. Pat. No. 4,303,492. In these earlier disclosures, self-contained hollow electrode assemblies are provided which are normally submerged in the suspension, but bodily removable therefrom for inspection or other purposes. These hollow electrodes comprise two types of wall surfaces: ion-pervious walls for electrode assemblies of one polarity and liquid-pervious walls for electrode assemblies of the opposite polarity. The wall surfaces of the electrode assemblies comprise chemically and electrically neutral filter media or permeable porous membrane backed by a supporting grid, thus presenting a planar electrode surface.

In operation, with electrode assemblies of both types immersed in the suspension, a source of vacuum is connected to the interior of the electrode assemblies having liquid-pervious walls to provide a controllable pressure differential thereby producing a flow of carrier liquid through the filtration surfaces, while the solids migrate in the opposite direction, under the influence of the electric field, to deposit as cake upon the electrode assemblies having ion-pervious walls. Filtrate liquid, that is, carrier liquid freed of solids, is withdrawn or pumped from the interior of the liquid-filled hollow electrode structure at a controllable rate.

As indicated, cake deposition occurs on the hollow electrode assemblies having ion-pervious surfaces; these electrode assemblies being filled with an electrolyte and having an electrode element therein immersed in the electrolyte, isolated from direct contact with the suspension. The electrolyte is specially selected for high conductivity and compatibility with the electrode element. By compatibility is meant the relatively non-corrosive character of the electrolyte under the conditions that ordinarily prevail within the hollow electrode assembly. Since decomposition or evolution products and heat are generated at the electrode element within the hollow ion-pervious electrode assembly, provision is made for a flow of electrolyte into and through the electrode chamber so that such foreign products and heat are swept out of the chamber and a relatively constant predetermined electrolyte composition is maintained.

The ion-pervious wall of the electrode assembly in these prior art structures comprises a chemically and electrically neutral filter media or permeable porous membrane which, if film-like in nature or otherwise requiring support, may be backed by a chemically and electrically neutral grid so that a planar electrode filter surface is presented to the slurry being treated. Since the cake will form on this electrode during electrofiltration and must be removed by contact with doctoring blades, a friction cage or spacing means may be provided to protect the filter medium from direct contact with the doctoring blades. The friction cage comprises a thin, open lattice or screenwork of relatively hard material covering the filter medium for contact with the doctoring blades while spacing means may comprise strips of plastic materials, such as Delrin acetal resin arranged in a frame-like configuration and of a thickness sufficient to prevent contact between the doctor blade and the filter medium. For the purpose of cake recovery, the electrode assembly may be raised to a position of emergence from the suspension, with the layer of collected solids or cake layer adhering thereto. Since the electrolyte remains within the electrode assembly in the raised position, a vacuum is applied internally of the electrode to reduce the pressure on the filter media and so prevent rupture of the filter media. When the electrode assembly is immersed in operation, the vacuum applied internally serves to remove gaseous products, such as chlorine or carbon dixoide evolved at the electrode element.

The ion-pervious electrode structures of the prior art, applied in the field of clay dewatering, exhibit certain operating problems. Since the clay particles in the feed material are of colloidal particle size, a significant amount of such clay particles pass through the filter medium. This clay accumulates in the chamber of the electrode assembly, contaminates the electrolyte circulating through the clay and restricts and blocks flow of electrolyte through the electrode chamber. Ultimately, the electrode assembly must be taken out of operation, disassembled, cleaned and reassembled, a time-consuming and expensive procedure. Further, it has been found that, electrolyte is being pumped from the chamber of the electrode assembly into the bath. This infusion of material into the bath materially and adversely affects the properties of the dewatered product.

In copending patent application Ser. No. 222,057, filed Jan. 2, 1981, there is disclosed a means for overcoming the above difficulties which involves the use of an ion-exchange resin membrane as the ion-pervious wall of the electrode assembly. In particular, the copending application points out that commercially available cation exchange (perfluorosulfonic acid) membranes sold under the trademark NAFION by E. I. duPont de Nemours Company function satisfactorily as the ion-pervious wall of the electrode, essentially eliminating mass flow of clay solids into the electrode assembly and of anolyte into the bath, while permitting passage of cations.

While these commercially available ion exchange materials represent a substantial improvement over the prior art ion-pervious wall materials, they do have significant disadvantages for practical commercialization. They are extremely expensive, costing perhaps $30 or more per square foot. Their dimensions may change 10–20% between a dry and wet state. They cannot be adhesively bonded or glued, making fabrication into leak-proof shapes with good mechanical properties difficult, if not impossible.

Accordingly, there exists a real need for an improved solid electrolyte as an ion-pervious electrode structure for electrofilter apparatus.

SUMMARY OF THE INVENTION

The invention is directed to a novel solid polymeric electrolyte which is made by coating a strong, relatively inert, fabric with a suspension of fine particles of an ion exchange resin.

In making the solid polymeric electrolyte of this invention a quantity of fine particles of an ion exchange resin is mixed with an organic binder and an organic solvent to form a mixture in which the particles of ion exchange resin are in suspension, impregnating a strong, fibrous, relatively inert, porous substrate with said resin-binder-solvent mixture, contacting the impregnated fabric with a diluent characterized by a high degree of miscibility with said organic solvent and a sufficiently low degree of compatibility with said organic binder to effect rapid precipitation of said binder from solution, maintaining said diluent in contact with said impregnated fabic until substantially all of said binder has preciptated to form a matrix bonding said particles of ion exchange resin to said fabric and each other, forming an essentially continuous film of ion exchange resin on said fabric and in the interstices thereof.

The fabric substrate may be either woven or unwoven. Dynel (a trademark of Union Carbide Company for a copolymer of vinyl chloride and acrylonitrile) fibers, polypropylene fibers or glass fibers, which are inert in the contemplated systems, may be used to provide the strong, inert, fabric required.

A cross-linked sulfonated polystyrene (sold by Rohm and Haas under the trade designation Amberlite) has proved a satisfactory ion exchange resin for this application, but other ion exchange resins such as sulfonated polyphenylene sulfides may also be employed. These resins are available in particle form. The particles of ion exchange resins should be very fine, preferable of a 325 mesh (Tyler mesh series); i.e., the particles are of a range of sizes which pass a 325 mesh screen.

An organic binder such as Kynar (a trade designation of Pennwalt Chemical Company for polyvinylidene fluoride) is employed to bind the ion exchange resin particles to the fabric and to each other.

The solvent is preferably DMAC (dimethylacetamide), but DMF (N,N'-dimethylformamide) and N-2 Pyrrolidinone may also be employed.

The diluent is preferably water, but, in some cases, a mixture of water and an organic solvent and/or surfactants may be used.

The mixture of resin particles, binder and solvent may be applied to the fabric substrate by painting (brush, roller, spray, etc.), coating, casting or dipping.

The diluent is preferably brought into contact with the solvent by dipping. Following precipitation of the organic binder, the coated fabric may be air dried, but this is not always necessary and, in fact, in some cases it is preferable to maintain the coated fabric in a moist condition because the material is more flexible when moist.

EXAMPLES OF THE INVENTION

Two mixtures were prepared, the first, a 20% Kynar binder—20% cross-linked sulfonated polystyrene (Amberlite CG-120) in DMAC, and the second, a 30% Kynar—40% cross-linked sulfonated polystyrene (Amberlite CG-120) in DMAC. The percentages given are in weight percent. The cross-linked sulfonated polystyrene was in the form of particles of −325 mesh.

The above mixtures were cast on Dynel and polyproylene filter cloths and thereafter dipped in water to precipitate the Kynar binder to form a surface film of ion exchange resin. This surface film was tightly bonded to the filter media.

It was found that thin films were more flexible than thick films and that the films were more flexible when wet than when dry.

The Kynar binder penetrated into the filter cloth structure with slight attack to the Dynel fibers, which resulted in somewhat better adherence than with the polypropylene filter cloth.

The composite or reinforced solid electrolyte structure was nearly impermeable. A disc of the solid electrolyte, having a surface area of about 1 square inch, passed only 3 cc/min of water at a vacuum pressure differential of 30" Hg. When exposed to a clay slurry, at the same ΔP, no clay or water was observed to pass.

A mixture composed of (in wt. %) 18.5% Kynar 961, 24.6% Amberlite IRP69M particles, 43.1% DMAC, balance water was prepared. The mixture had a viscosity >1200 cp. Dynel bags mounted on the anodes and having a nominal surface area of 12 square feet were brush painted with this mixture. Water was then sprayed lightly on the bag exterior and the bags were then lowered into a clay-water slurry (the bath of an electrofilter), and left overnight to precipitate the Kynar binder. The next day the anodes were operated in the electrofiltration of a clay slurry and substantial clay cake was deposited thereon. The cakes were firm and sheet-like and doctored off completely. Essentially no clay was detected as having passed through the bag into the interior of the anode. Power loss (as compared with uncoated Dynel bags) in the electrofiltration was negligible; i.e., less than 2%.

Although the present invention has been described in conjunction with preferred embodiments, it is to be understood that modification and variation may be resorted to without departing from the spirit and scope of the invention as those skilled in the art will readily understand.

I claim:

1. A solid polymeric electrolyte comprising a three-phase structure including a porous, woven or unwoven, substantially inert, fiber substrate, a film, impregnating said substrate, comprising fine particles of an ion exchange resin and a water insoluble matrix of an organic binder essentially permanently binding said particles to said fiber substrate and to each other, said binder having been precipitated onto said substrate from a mixture of binder, an organic solvent therefor and resin particles in suspension, by contact with a diluent characterized by a high degree of miscibility with said organic solvent and a relatively low degree of compatibility with said binder, forming an essentially continuous film of ion exchange resin and binder on said fiber substrate and in the interstices thereof capable of receiving a deposit thereon in the form of a cake of particulate solids, said solid polymeric electrolyte being essentially impervious to water.

2. The solid polymeric electrolyte of claim 1 wherein the ion exchange resin is a cation exchange resin.

3. The solid polymeric electrolyte of claim 1 wherein the ion exchange resin is a cross-linked sulfonated polystyrene.

4. The solid polymeric electrolyte of claim 1 wherein the ion exchange resin is a cross-linked sulfonated polyphenylene sulfide.

5. The solid polymeric electrolyte of claims 1, 2, 3 or 4 wherein the ion exchange resin particles are −325 mesh in size and the fiber substrate is composed of a copolymer of vinyl chloride and acrylonitrile, of polypropylene or of glass fibers.

* * * * *